(12) United States Patent
Robison

(10) Patent No.: US 8,108,867 B2
(45) Date of Patent: Jan. 31, 2012

(54) PRESERVING HARDWARE THREAD CACHE AFFINITY VIA PROCRASTINATION

(75) Inventor: Arch D. Robison, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 879 days.

(21) Appl. No.: 12/215,154

(22) Filed: Jun. 24, 2008

(65) Prior Publication Data

US 2009/0320040 A1 Dec. 24, 2009

(51) Int. Cl.
*G06F 9/30* (2006.01)
(52) U.S. Cl. ........................................... 718/102
(58) Field of Classification Search ................ None
See application file for complete search history.

(56) References Cited

U.S. PATENT DOCUMENTS 5,287,508 A * 2/1994 Hejna et al. .................... 718/102
5,317,738 A * 5/1994 Cochcroft et al. ............. 718/103

OTHER PUBLICATIONS

Acar, Umut A. et al. "The Data Locality of Work Stealing"; 2000; Retrieved from http://citeseer.ist.psu.edu/339767.html; 12 pages.

* cited by examiner

*Primary Examiner* — Robert Fennema
(74) *Attorney, Agent, or Firm* — Derek J. Reynolds

(57) ABSTRACT

A method, device, system, and computer readable medium are disclosed. In one embodiment the method includes managing one or more threads attempting to steal task work from one or more other threads. The method will block a thread from stealing a mailed task that is also residing in another thread's task pool. The blocking occurs when the mailed task was mailed to an idle third thread. Additionally, some tasks are deferred instead of immediately spawned.

17 Claims, 5 Drawing Sheets

PRESERVING HARDWARE THREAD CACHE AFFINITY VIA PROCRASTINATION

FIELD OF THE INVENTION

The invention relates to cache affinity in a computer system with multiple hardware threads.

BACKGROUND OF THE INVENTION

Work stealing is a widely used algorithm for balancing load in parallel programs designed to run on multi-core processors and multi-socket processor systems. For example, OpenMP (Open Multi-Processing) 3.0, Cilk, Intel® TBB (Thread Building Blocks), and Microsoft® ParallelFX all utilize work stealing algorithms. However, in programs that repeatedly sweep arrays (as in relaxation or time-step numerical methods), elements are processed on different processors on different sweeps. This hurts performance because items have to be moved between caches.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Figure 1:
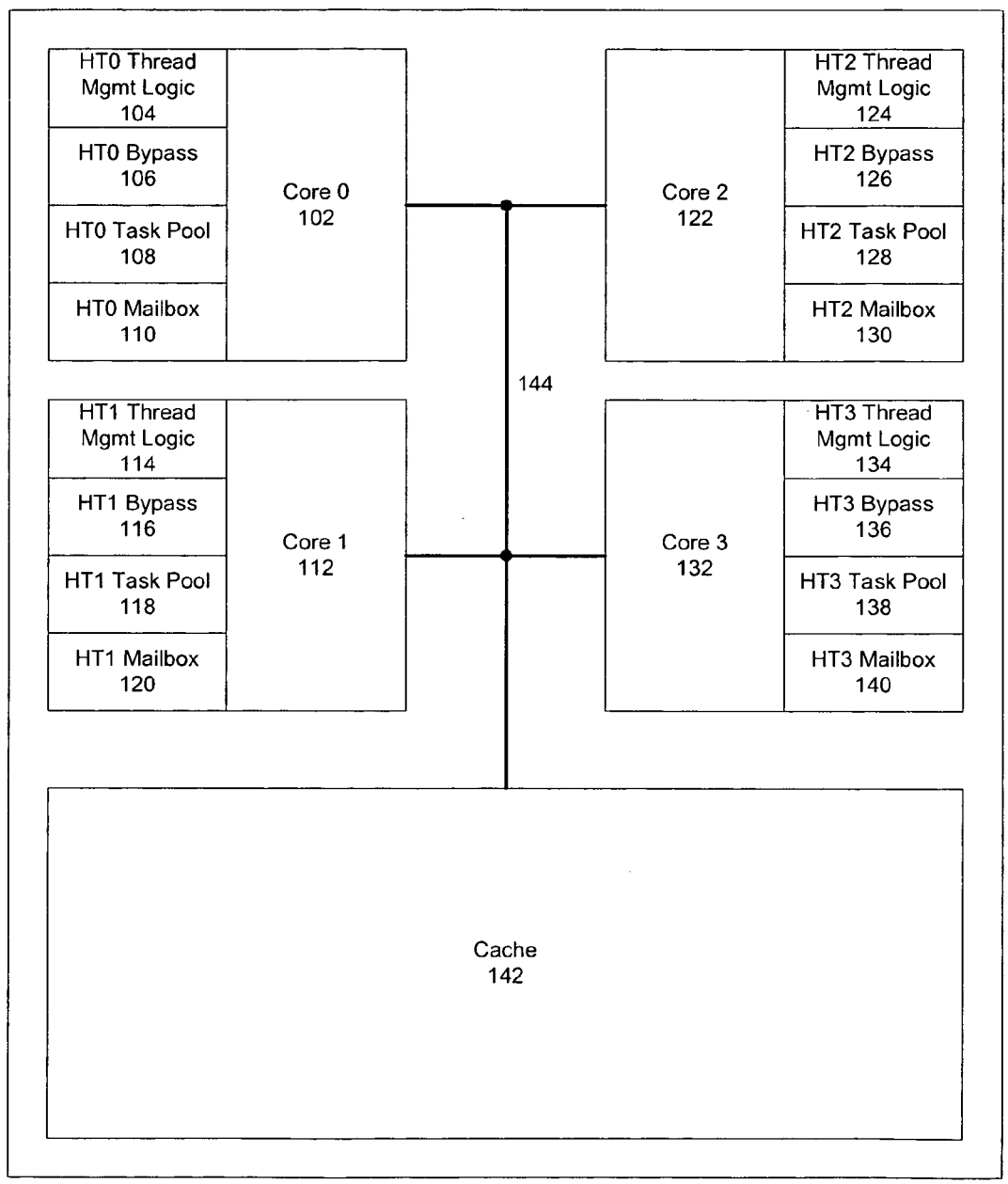
FIG. 1 describes an embodiment of a computer system with multiple hardware threads that are capable of utilizing task-based procrastination to preserve cache affinity.

Embodiments of a method, device, and system to preserve cache affinity in a computer system with multiple hardware threads via procrastination are disclosed. A system with multiple hardware threads includes a multi-core processor that has at least one hardware thread per core or a multiple socket computer system with multiple processors plugged into the multiple sockets where each plugged in processor has at least one hardware thread. Computer systems with multiple hardware threads allow each hardware thread to perform work separately and in parallel to speed up the overall execution performance of the system. In a perfect environment, all hardware threads would always be busy and performing their own work. Though, in a real-world workload, certain hardware threads tend to be busier than other hardware threads. When a thread becomes idle, it is allowed to steal work, in the form of tasks, from another thread. The stolen task has to be waiting to be worked on in a task pool of one of the threads; it can't be stolen if a thread is currently working on the task.

Issues arise when tasks are stolen, including, potentially, a decline in cache affinity. Cache affinity arises when a particular thread that has performed task work on certain data is allowed to then perform additional work on the same data or data in close proximity to the originally worked-on data. For example, the work may involve sweeping an array that resides at least partially within a cache. This allows a processor cache to potentially store portions of data sets across multiple tasks and eliminates at least some accesses to main memory if the data sets are able to remain within the cache.

Each hardware thread is granted a portion of the cache in the processor. When one thread steals a task that may have shown affinity to another thread, the efficiency and effectiveness of the cache is potentially reduced. Thus, it is important to attempt to prevent a thread from stealing a task that has affinity to another thread.

Additionally, each hardware thread has a task pool of tasks that are waiting to be operated on, each thread has a mailbox which receives tasks mailed from other threads, and each thread has a bypass which stores the task that is immediately to be worked on by the thread.

When a thread in a processor becomes aware that a task has affinity to another thread, the aware thread can mail the task to the thread with affinity. The task appears in the mailbox of the thread receiving the task, but the task also remains in the task pool of the thread sending the task. The thread receiving the task may be busy or idle. A thread cannot steal a task directly from another thread's mailbox, but it can steal a thread from another thread's task pool.

In many embodiments, if the thief thread (i.e. the thread attempting to steal work) sees a task in another thread's task pool, the thief thread then must look to see if that task has been mailed to another thread. If the task has been mailed, then the thief thread can only steal the task from the task pool if the receiving thread that has the task in its mailbox is not idle. In other words, in many embodiments, a thief thread deliberately does not steal a task from another thread's task pool if that task has already been mailed to an idle thread. This is due to an affinity issue. Specifically, if a task has been mailed to another thread, the implication is that the task has affinity to the thread it is mailed to. If a thread is idle and has a task sitting in its mailbox, there is high probability that the thread is momentarily going to pull tasks from its mailbox to work on. Thus, it is generally beneficial to allow the idle receiving thread some additional time to access its mailbox.

On the other hand, if the receiving thread is busy working on another task, the thief thread is allowed to steal the task from the mailing thread's task pool because it would not be known how long the receiving thread is going to be busy with work. Potentially, the mailed task may wait a significant time before it is serviced.

Furthermore, in a an environment with multiple hardware threads, it is common for a thread to spawn two child tasks from the current task it is working on when a binary task tree format is utilized. When this takes place, a first child task is spawned directly into the thread's bypass and a second child task can be specifically spawned into the same thread's task pool and, optionally, additionally mailed to another thread. When a child task is mailed to another thread, the same mailbox rule stated above applies. Though, when a child task is spawned directly to the same thread's task pool, that task can potentially be stolen by a thief thread because the spawning thread is busy with the bypass work and the task is sitting, waiting to be worked on, in the thread's task pool.

Thus, in many embodiments, when a thread spawns two child tasks and neither one is mailed to another thread, the spawning thread can defer (i.e. procrastinate) spawning the non-bypass-bound task into its own task pool. This also may potentially preserve affinity if both tasks (i.e. the bypass-bound child task and the task pool-bound child task) have affinity to the spawning thread. The deferment is not endless though. In many embodiments, the deferment is held until the spawning thread no longer spawns any additional child tasks and the bypass-bound child task, as well as any further bypass-bound bound descendant tasks, have their work completed. A bypass-bound descendant task is a child task, grandchild task, etc. spawned from a bypass-bound task to the bypass. In other words, in a binary task tree, the bypass-bound descendant tasks (i.e. child/grandchild/etc. tasks) from any initial point on the tree are the tasks comprising the left-most branch from the initial point on down the tree.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

FIG. 1 describes an embodiment of a computer system with multiple hardware threads that are capable of utilizing task-based procrastination to preserve cache affinity. In many embodiments, multi-core processor 100 has hardware threading capabilities and resides in a computer system. In different embodiments, the computer system that contains the multi-core processor 100 may be a desktop computer, a server computer, a laptop computer, a handheld electronic device, a television set top computer, an integrated computer within an appliance or vehicle, or any other type of conceivable computer system within the scope of the various embodiments described below.

In the embodiment shown in FIG. 1, multi-core processor has four cores (core 0-3, items 102, 112, 122, and 132). Each core includes multiple units to perform work (e.g. an execution unit). Included in the circuitry within or directly attached to each core is logic to manage multithreading amongst the four cores. For example, within core 0 (102) there may be hardware thread 0 (HT0) thread management logic 104 as well as storage locations: HT0 bypass storage 106, HT0 task pool storage 108, and HT0 mailbox 110. In large part the threads discussed below are specifically hardware threads. In other words, a hardware thread comprises a core. Thus, when discussing "threads" below, the term "thread" refers to a "hardware thread" or core, unless specifically mentioned otherwise.

In many embodiments, this circuitry is needed for each core. Thus, there is thread management logic in HT1-3 (items 114, 124, and 134, respectively). Additionally, each core has a corresponding set of storage locations: HT1-3 bypass storage (items 116, 126, and 136), HT1-3 task pool storage (items 118, 128, and 138), and HT1-3 mailbox storage (items 120, 130, and 140).

Thread management logic may include a number of rules that manage the interrelationship between the four hardware threads. This management includes assigning and distributing the work (i.e. tasks) among the four hardware threads. The thread management logic may be comprised of circuitry and/or microcode or other software-based code stored internally within the processor.

Furthermore, at least one shared cache memory 142 is also present within the processor 100. In many embodiments, the cache memory 142 is coupled to each of the four cores by an interconnect 144 internal to the processor. In many embodiments, the interconnect may include a number of traces that are capable of transporting addresses, data, control, and clocking information between the cores and the cache memory 142. The cache memory 142 is apportioned so all four threads (i.e. the four cores) have access to the cache and receive enough space in the cache to be able to complete work. As mentioned above, if one thread is working on a data set and that data set has been written into the cache, the thread is said to have affinity with the cache regarding that data.

Each thread performs work through a task-based system. A task is assigned to a thread and the thread begins working on the task. If the task can be split into relatively equal weighted child tasks, then the split will generally take place to share task work amongst the threads. In many embodiments, each task that is split is specifically split into two child tasks so the task tree can take on the characteristics of a binary tree. Furthermore, a task that is split into two child tasks can be referred to as the parent task of the two child tasks. If one or more of the resulting child tasks is split further, the next level of child tasks would be referred to as the grandchildren tasks of the original parent task (i.e. now grandparent task). The children, grandchildren, etc. tasks of an initial task can also be referred to as descendant tasks to the initial task and the initial task can be referred to as an ancestor task to its children, grandchildren, etc. tasks. Additionally, when a task is split into two child tasks, this can be referred to as the thread working on the task "spawning" the two child tasks.

Another aspect of a split parent task (into two spawned child tasks) is that once the parent task has been split, it no longer requires additional work. The work that comprised the parent task is now split as evenly as possible among the two child tasks. When a parent task splits into two child tasks, the thread that was working on the parent task sends the left child task into the thread's bypass storage (e.g. for HT0 the left child task is sent into bypass 106). The bypass is a temporary storage that stores the task work that the thread is to perform next. Thus, only one task at any given time is in a thread's bypass and that task will have work immediately performed on it by the thread after the spawning process has completed.

The destination of the right child task is based on the task's affinity. If the right child task has no affinity for another thread, the right child task is sent to the spawning thread's task pool. A thread's task pool is a storage pool of tasks which are not yet in the thread's bypass. When a thread finishes the work on the task in its bypass and that bypass task does not spawn any additional child tasks, then the thread can begin taking work from front of its task pool. A thread treats its own task pool as a LIFO (last in, first out) queue. Thus, the most recent right child task that was spawned would be the first task the thread would perform work upon.

On the other hand, if a right child task has affinity for another thread, then the spawning thread will mail the task to thread with affinity. This mailed task arrives in the mailbox of the receiving thread. A mailed task actually has two copies. One copy of the mailed task is sent to the receiving thread's mailbox. A second copy of the mailed task remains in the spawning thread's task pool. If the spawning thread finishes work on a bypass task prior to the receiving thread finishing its work, then under certain circumstances, the spawning thread may go ahead and pull the copy of the mailed task out of its own task pool and work on it. If this happens, then when the receiving thread eventually has the time to work on the mailed task, it will see that the task has been marked as already worked on and move to any other task work. An idle thread will look for work (i.e. a task) in the following order:
1) Take work from its own bypass
2) Take work from the front of its own task pool
3) Take work from the front of its own mailbox
4) Steal work from the back of another thread's task pool A thread that attempts to steal a task may be referred to as a thief thread and a thread that has a task stolen from it is referred to as a victim. In many embodiments, HT0-HT3 thread management logic (102, 112, 122, and 132, respectively) includes a "mailbox rule", which modifies step #4 above. Generally the mailbox rule will not allow a thief thread to steal a task from a task pool of a second thread if that task is also in the mailbox of a third thread and the third thread is idle (this can be referred to as blocking a thief from stealing). This can be codified by this language modification to step #4:
4) Steal work from the back of another thread's task pool, unless that work has been mailed to an idle thread. If so, skip that piece of work and go to the next piece of work in that thread's pool.

If the third thread is busy, then the thief thread would be allowed to steal the task. But, in the case that the third thread is idle, it is generally assumed that an idle thread will momentarily be looking for work in its task pool and/or its mailbox. Thus, there is a high likelihood that the third thread is about to start work on the task that the thief thread wants to steal. It is generally considered more efficient to have the receiving third thread perform work on the task it receives in the mail because it is assumed to have affinity with that task (because it is the recipient of the mail). With this task stealing limitation, cache affinity may be preserved at a greater rate during parallel operation of multiple hardware threads.

Furthermore, a thief may get around this limitation if a spawning thread that splits a parent task into two child tasks does not mail the right child task to another thread. In other words, a left child task is sent to the spawning thread's bypass and a right child task is sent to the spawning thread's task pool. In this case, the spawning thread has work to do on the bypass-bound child task and thus the right child task would generally be a candidate to be stolen by a thief thread while it is waiting to be worked upon.

In many embodiments, the right child task may have affinity to the spawning thread because the spawning thread was just performing working on the right child task's parent task (which presumably would utilize the same or similar data sets that might already be in the cache 142). Thus, an additional "delay rule" to limit the thieving abilities of the thief thread may be implemented that delays a spawning thread from sending its right child task into the spawning thread's task pool. In many embodiments, this delay lasts until the spawning thread has finished work on the bypass-bound child task as well as any further bypass-bound descendant tasks.

Once no additional bypass-bound child or further descendant tasks are spawned, then the spawning thread releases any delayed child tasks that were bound for the spawning thread's task pool. This task release may consist of one or more child tasks entering the spawning thread's task pool at the same time. If there is more than one delayed child task, then the spawning thread's task pool is filled up in the order in which the child tasks were originally delayed. Thus, the most recently delayed child task would be the first child task to be worked on from the spawning task.

Once the delayed child task(s) have been released into the spawning thread's task pool, any thief thread then would again have the ability to steal one or more of the tasks. One possible assumption may be that in the course of the delay, the thief thread may have subsequently received other work, thereby leaving the delayed child tasks to be worked on by their spawning thread. This additional procrastination task stealing limitation also may preserve cache affinity at a greater rate during parallel operation of multiple hardware threads.

FIGS. 2A-2F describe an embodiment of a series of task spawning events in a four core processor that utilize procrastination to preserve affinity. Work that has been done or is being currently done on a task is shown by displaying the hardware thread blocks encompassing a task location. E.g. the moment in time that FIG. 2A captures shows that task T0 has already been worked on and task T1 is being worked on by HT0, but task T2 has not yet been worked on by HT2.

Figure 2A:
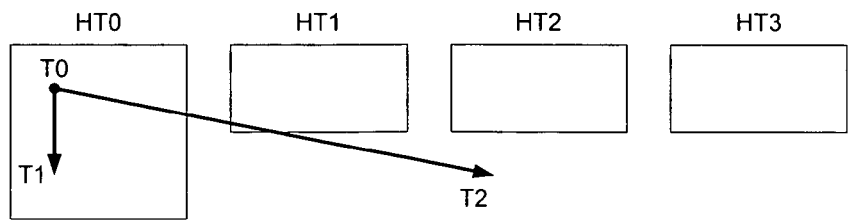
FIGS. 2A-2F describe an embodiment of a series of task spawning events in a four core processor that utilize procrastination to preserve affinity.

Turning now to FIG. 2A, task T0 has been worked on by HT0. Task T0 is then split into two child tasks, T1 and T2, which are spawned by HT0. T1 is the left-most spawn, which dictates that T1 is sent to the HT0 bypass for work by HT0. T2 has been found to have cache affinity for HT2, thus T2 is mailed to HT2. Although not shown to avoid convoluting the figure, a copy of T2 is sent to the HT0 task pool, as discussed above regarding mailed tasks. HT0 immediately begins working on T1. HT2 has not begun work on T2, thus at the moment T2 is sitting in HT2's mailbox and in many embodiments HT2 is momentarily idle. Additionally, in many embodiments, HT3 may be idle and will attempt to steal tasks from HT0-HT2. Though, in FIG. 2A, T0 has had its work completed, T1 is being worked on by HT0 and T2 cannot be stolen because it was mailed to an idle thread, HT2.

Figure 2B:
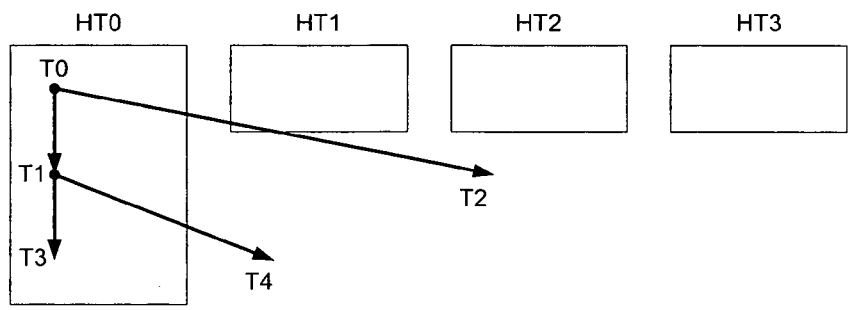

In FIG. 2B, T1 is split and so HT0 spawns two child tasks from T1, namely T3, which is sent to the bypass, and T4, which is mailed to HT1. As soon as the spawning takes place, HT0 will have finished work on T1 and will begin work on T3. In the embodiment shown in FIG. 2B, HT1 is idle and has T4 in its mailbox. Additionally, HT2 remains idle with T2 in its mailbox. Thus, T2 and T4 cannot be stolen by thief thread HT3.

Figure 2C:
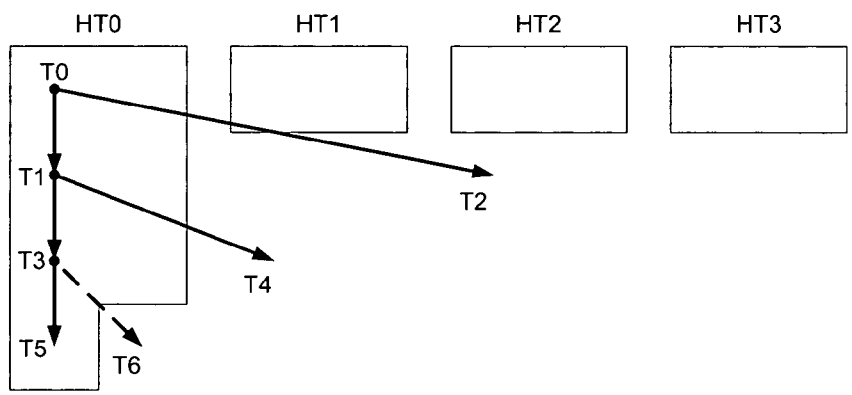

FIG. 2C shows task T3 being split, which has HT0 spawn two child tasks from T3. Child task T5 is sent to the HT0 bypass and child task T6 has no affinity with another thread so it would be sent to the HT0 task pool. But due to the second procrastination rule to preserve affinity, T6 is delayed from being sent to the spawning thread's (HT0's) task pool. The delay is shown in FIG. 2C by way of the dashed line that represents the spawning of T6. In many embodiments, there is a deferral list (e.g. a delay buffer) in each thread's logic that stores the delayed task-pool bound child tasks. In FIG. 2C, T6 has been delayed from being sent to the spawning thread's (HT0's) task pool because HT0 is still working on a spawned bypass-bound child thread (T5). Thus, potential thief thread HT3 cannot steal T6 because it has not yet entered HT0's task pool.

Figure 2D:
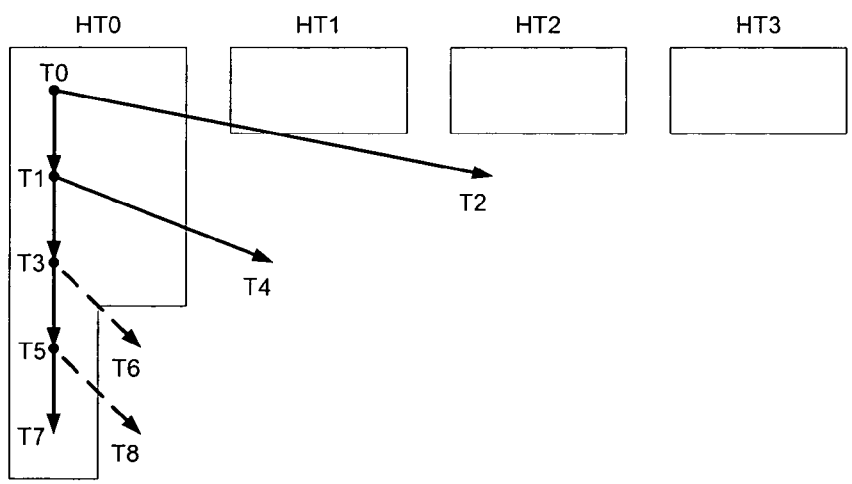

Next, FIG. 2D shows the spawned bypass-bound child thread splitting into two additional spawned child threads, T7 and T8. T7 is spawned to the HT0 bypass and T8 also is delayed from being sent to HT0's task pool. HT0 is working on T7 which is a sibling bypass-bound child task to T8 and the bypass-bound descendant task of T5. Thus, because HT0 is still working on a bypass task, both T6 and T8 are delayed from entering the HT0 task pool. Therefore, thief thread HT3 cannot steal T6 or T8 because neither has yet entered HT0's task pool.

Figure 2E:
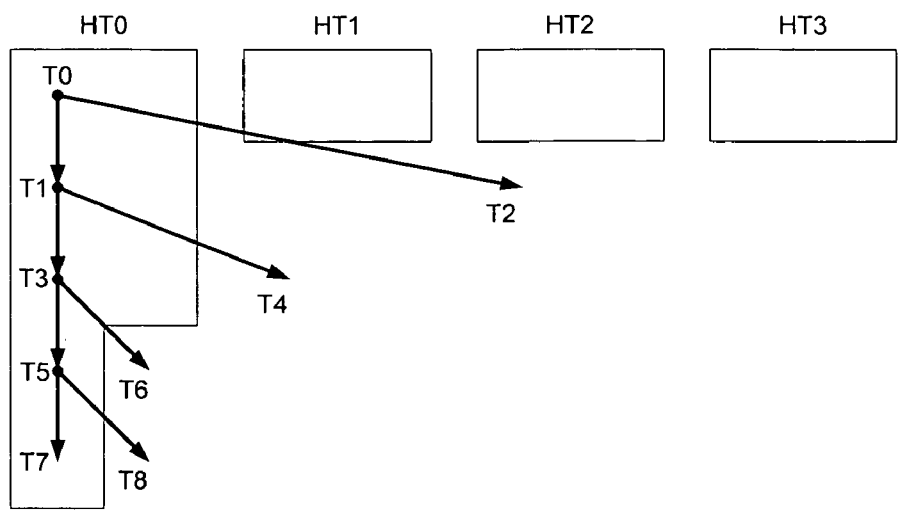

FIG. 2E shows a point in time after HT0 has finished work on T7. T7 does not split into any further child tasks and so HT0 has finished work on all bypass-bound child/descendant tasks. Thus, as soon as the T7 work has been completed, thread HT0 management logic releases T8 and T6 into HT0's task pool. Specifically, T6 enters the task pool first and T8 enters the task pool second. As a result, HT0 may next begin work on T8 when it can.

Figure 2F:
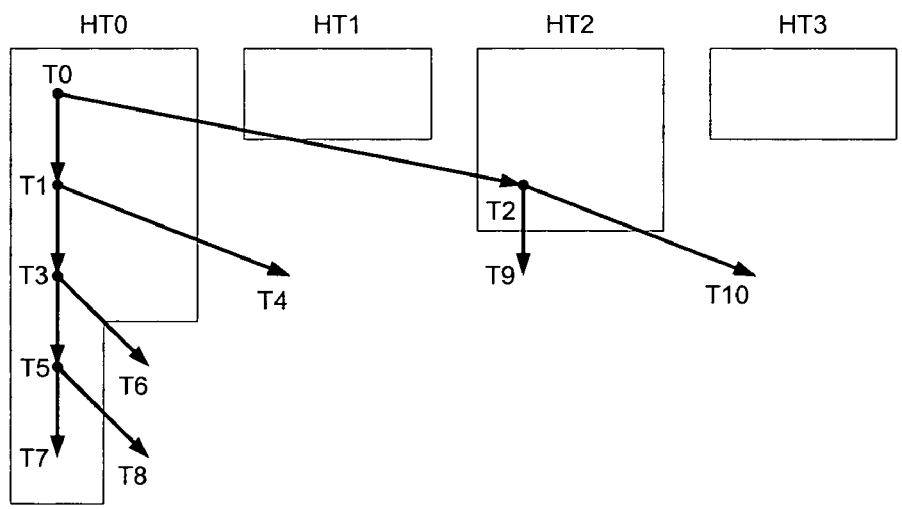

FIG. 2F shows HT2 has begun work on T2, which is split into two child tasks, T9 and T10. T9 is spawned and sent directly to the HT2 bypass and T10 is mailed to HT3 due to affinity. Thus, at this point all four threads have work that may maintain affinity. Again, the two affinity preservation rules are as follows: 1) the mailbox rule—a thief thread cannot steal a task sitting in a mailbox of a thread that is idle, and 2) the delay rule—a spawning thread will delay sending a task-pool bound child thread to the spawning thread's task pool until the spawning thread's bypass-bound child thread and any further bypass-bound descendant threads have completed being worked on. These rules are both related to procrastination of work. In other words, the mailbox rule involves forcing a potential thief thread to procrastinate stealing certain threads and the delay rule involves voluntary procrastination of a thread sending certain work to its own task pool. Without these rules, HT3 may have stolen T2, T4, T6, or T8, each of these tasks potentially have affinity to HT2, HT1, and HT0, respectively. Thus, HT3 may have limited the cache affinity potential of the task tree that started with task T0. Furthermore, if HT3 had been allowed to steal T2, T4, T6, or T8, then it might have been performing work on one of those tasks and not had the opportunity to work on T10, for which HT3 has affinity.

Figure 3:
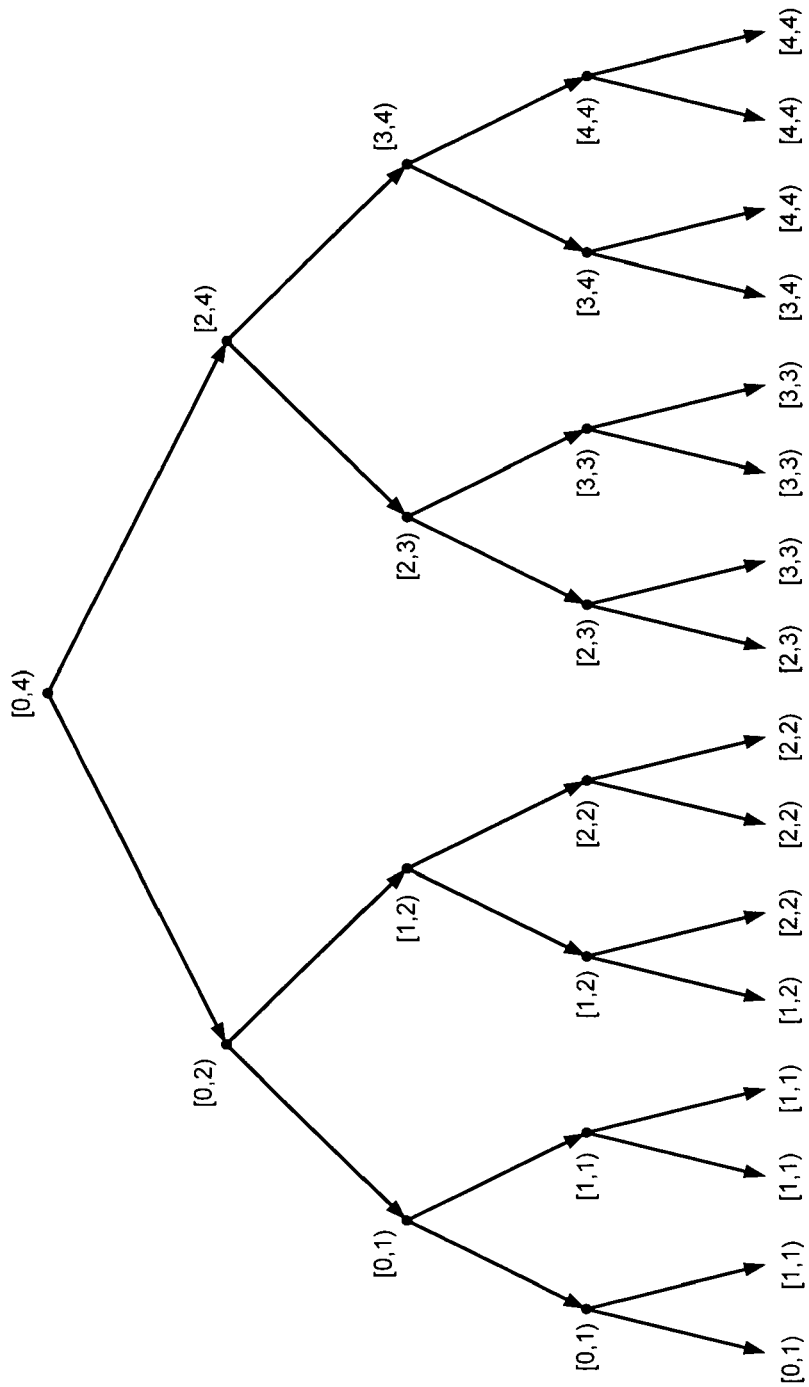
FIG. 3 illustrates an embodiment of an interval-based binary task tree that subscribes to the delay rule.

FIG. 3 illustrates an embodiment of an interval-based binary task tree that subscribes to the delay rule. The intervals shown in FIG. 3 each include the following format [i,j). In an interval [i,j) the i value is called the lower bound and the j value is called the upper bound. A half-open interval [i,j) contains the integers between the lower and upper bound, inclusive of the lower bound but exclusive of the upper bound. An interval describes the domain of threads. For example, the top interval [0,4) can be interpreted as "the set of threads {0,1,2,3}". The delay rule can be interpreted as "if the interval has exactly one thread, delay the right child". The delayed child (and its descendants) end up with an empty interval, and so they never delay their offspring.

The intervals associated with each task can be populated using the following interval creation rules:

1) A root task (i.e. the task at the top of the binary tree) has the interval [0,P), where P is the number of cores in the system.

2) For a task with the interval [i,j), compute m=j−⌊(j−i)/2⌋, where ⌊ . . . ⌋ denotes rounding downwards to an integer when . . . is not an integer.

3) The left child gets interval [i,m).

4) The right child gets interval [m,j).

5) A parent task delays spawning its right child if j−i=1.

Thus, in FIG. 3, the root task (for the 4-core processor shown in FIG. 1) has interval [0,4) because of rule 1. Computing m for the root task gives us 4−⌊(4−0)/2⌋, which makes m=2 for the root task. Thus, the left child of the root task gets interval [0,2) and the right child of the root task gets interval [2,4). This calculation can be done down each branch of the binary interval tree shown in FIG. 3 to come up with all the displayed intervals. As mentioned above, if the interval at a given task in the tree has exactly one thread, the right child of that task is delayed and conforms to the delay rule.

Figure 4:
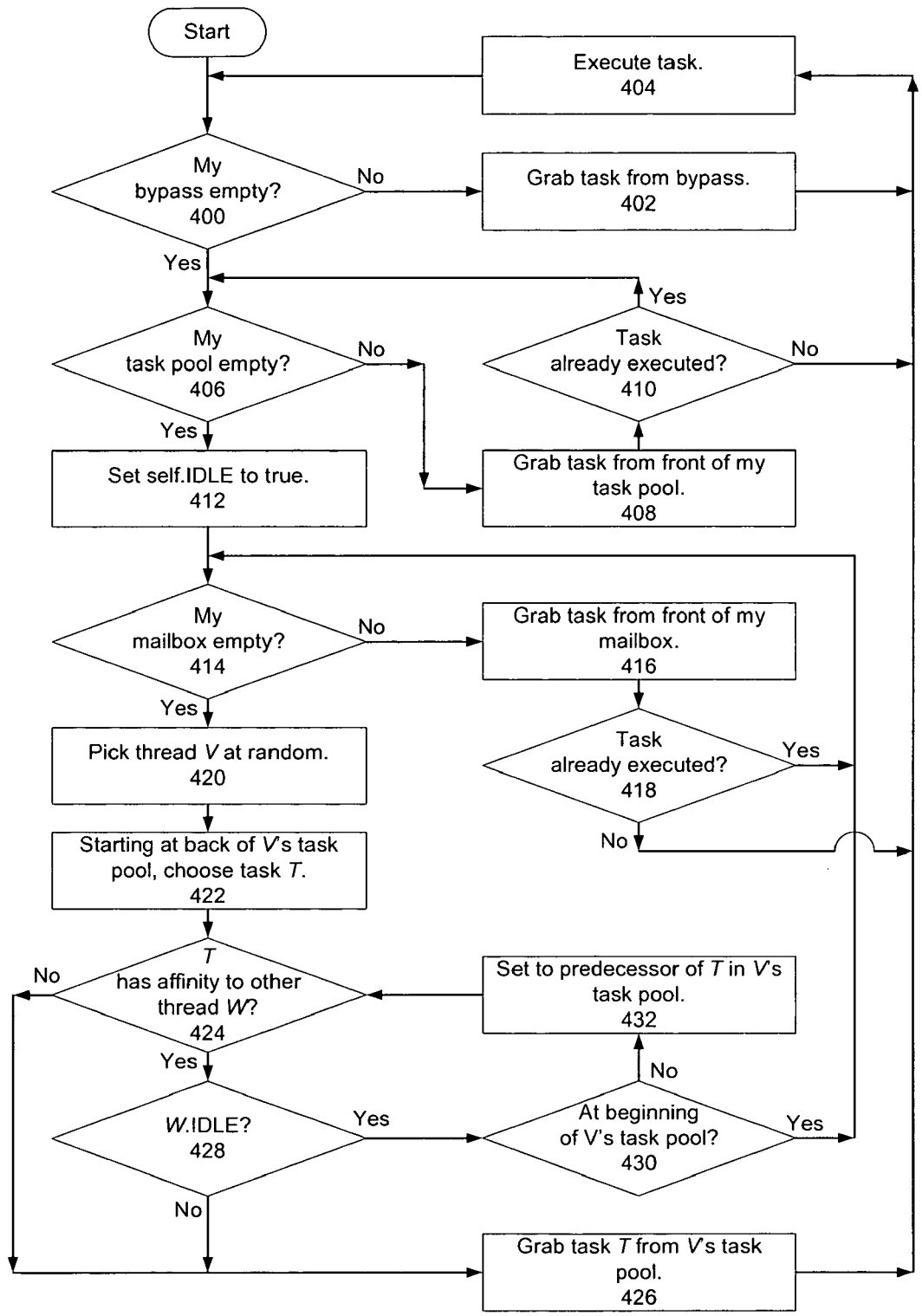
FIG. 4 is a flow diagram of an embodiment of a process to conform a system with multiple hardware threads to the mailbox rule.

FIG. 4 is a flow diagram of an embodiment of a process to conform a system with multiple hardware threads to the mailbox rule. The process is performed by processing logic, which may comprise software, hardware, or a combination of both. Additionally, the processing logic is viewed from the point of view of a given thread. Turning now to FIG. 4, the process begins by the thread's processing logic checking to see if its own bypass is empty (processing block 400). If the bypass is not empty then the thread's processing logic grabs the task in the bypass (processing block 402). Once the thread's processing logic has the task from the bypass, then it can execute the task (processing block 404).

Returning to block 400, if the bypass is empty then the thread's processing logic checks to see if its task pool is empty (processing block 406). If the task pool is not empty, then the thread's processing logic grabs a task from the front of its task pool (processing block 408). The thread's processing logic then checks to see if the task at the front of its task pool has already been executed (processing block 410). For example, a task in the thread's task pool may have been executed if the task was also mailed to another thread with affinity to the task and that receiving thread has already executed the task.

If the task from the task pool was not already executed, then the thread's processing logic executes the task (processing block 404). If the task was already executed, then processing logic returns the thread to block 406 to check again if the task pool is empty. If the task pool is empty, then the thread's processing logic sets a self.IDLE flag to true (processing block 412). The idle flag, when set, tells all other threads that current thread being discussed is idle, which creates implications for other potential thief threads.

Once the thread's processing logic sets itself to idle, the processing logic then checks to see if its mailbox is empty (processing block 414). If the mailbox is not empty, then the thread's processing logic grabs a task from the front of its mailbox (processing block 416). The thread's processing logic then checks to see if the task at the front of its mailbox has already been executed (processing block 418). For example, a task in the thread's mailbox may have been executed if the thread was busy when the mailed task was sitting in the thread's mailbox and a thief thread noticed this and stole the task.

If the task at the front of the mailbox has not been executed, then processing logic executes the task (processing block 404). Otherwise, if the task has been executed then processing logic returns to block 414.

If processing logic at block 414 does determine that the thread's mailbox is empty, then the thread's processing logic picks another thread V at random (processing block 420). In a 4-core system, thread V can be any of the other three hardware threads. The choice may be random based on a random number generator algorithm or by any another method that can pick a number (i.e. thread) at random.

Once the thread's processing logic has picked another thread V, then the thread's processing logic focuses on V's task pool. Starting from the back of V's task pool, the thread's processing logic chooses task T (processing block 422). The thread's processing logic then determines if T has affinity to another thread W (processing block 424). As discussed above, the way in which a task in a task pool is determined to have affinity to another thread is by determining if the task is currently sitting in another thread's mailbox. Therefore, the thread's processing logic will determine affinity and if no affinity to another thread W exists (i.e. task T is not currently sitting in any other thread's mailbox), then the processing logic grabs task T from V's task pool (processing block 426) and then executes task T (processing block 404).

Returning to block 424, if task T does have affinity to another thread W, then processing logic checks to see if thread W is idle (processing block 428). If thread W is not idle, then the thread's processing logic grabs task T from V's task pool (processing block 426) and then executes task T (processing block 404). Otherwise, if thread W is idle, then processing logic determines whether task T was at the beginning of V's task pool (processing block 430). If task T was at the beginning of V's task pool, that means that there is no task in V's task pool that the thread can execute. Thus, the thread's processing logic returns to block 414 to check again if its mailbox is empty.

Otherwise, if the thread is not at the beginning of V's task pool, the thread's processing logic decrements one position in V's task pool and focuses on the predecessor task of task T in V's task pool (processing block 432). Once the thread's processing logic is focusing on the predecessor to task T, processing logic returns to block 424 and checks to see if the predecessor to T has affinity to another thread and the remainder of the process repeats.

Thus, embodiments of a method, device, and system to preserve cache affinity in a computer system with multiple hardware threads via procrastination are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
   managing one or more threads attempting to steal task work from one or more other threads by blocking at least a first thread from stealing a mailed task from a second thread's task pool when the mailed task was mailed by the second thread to an idle third thread, wherein each of the one or more threads includes a bypass which is capable of storing a task that is to immediately be worked on by the thread;
   deferring a spawning of one or more tasks from at least one of the one or more other threads; and
   when the second thread attempts to spawn a pair of child tasks that both target the second thread, wherein the pair of child tasks include a bypass-bound child task and a task pool-bound child task, deferring the spawning of the task pool-bound child task until the bypass-bound child task and any further spawned bypass-bound descendant tasks have been completed.

2. The method of claim 1, further comprising:
   spawning the deferred task pool-bound child task and any other deferred task pool-bound descendant tasks in the order deferred.

3. The method of claim 2, further comprising:
   storing a deferral list to preserve the spawn order of the deferred task pool-bound child task and the any other deferred task pool-bound descendant tasks.

4. The method of claim 1, further comprising:
   when the first thread is idle, causing the first thread to take a task from the front of a first thread task pool;
   when the first thread task pool is empty, causing the first thread to take a task from the front of a first thread's mailbox; and
   when the first thread's mailbox is empty, causing the first thread to attempt to steal a task from the back of the second thread's task pool.

5. The method of claim 1, further comprising:
   when the first thread is blocked from stealing the mailed task, causing the first thread to attempt to steal a predecessor task in the second thread's task pool.

6. A device, comprising:
   a multi-core processor including thread management logic to:
   manage one or more threads attempting to steal task work from one or more other threads by blocking at least a first thread from stealing a mailed task from a second thread's task pool when the mailed task was mailed by the second thread to an idle third thread, wherein each of the one or more threads includes a bypass which is capable of storing a task that is to immediately be worked on by the thread;
   defer a spawning of one or more tasks from at least one of the one or more other threads; and
   when the second thread attempts to spawn a pair of child tasks that both target the second thread, wherein the pair of child tasks include a bypass-bound child task and a task pool-bound child task, defer the spawning of the task pool-bound child task until the bypass-bound child task and any further spawned bypass-bound descendant tasks have been completed.

7. The device of claim 6, wherein the thread management logic is further operable to:
   spawn the deferred task pool-bound child task and any other deferred task pool-bound descendant tasks in the order deferred.

8. The device of claim 7, wherein the thread management logic is further operable to:
   storing a deferral list to preserve the spawn order of the deferred task pool-bound child task and the any other deferred task pool-bound descendant tasks.

9. The device of claim 6, wherein the thread management logic is further operable to:
   when the first thread is idle, cause the first thread to take a task from the front of the first thread's task pool;
   when the first thread task pool is empty, cause the first thread to take a task from the front of the first thread's mailbox; and
   when the first thread's mailbox is empty, cause the first thread to attempt to steal a task from the back of the second thread's task pool.

10. The device of claim 6, wherein the thread management logic is further operable to:
    when the first thread is blocked from stealing the mailed task, cause the first thread to attempt to steal a predecessor task in the second thread's task pool.

11. A system, comprising:
    an interconnect;
    a cache memory coupled to the interconnect; and
    a processor including:
    at least three hardware threads, wherein each of the at least three hardware threads includes a bypass task storage, a task pool task storage, and a mailbox task storage; and
    thread management logic associated with each hardware thread, the thread management logic to:
    manage one or more of the at least three hardware threads attempting to steal task work from one or more other of the at least three hardware threads by blocking at least a first hardware thread from stealing a mailed task from a second hardware thread's task pool when the mailed task was mailed by the second hardware thread to an idle third hardware thread, wherein each of the one or more threads includes a bypass which is capable of storing a task that is to immediately be worked on by the thread;

defer a spawning of one or more tasks from at least one of the one or more other threads; and when the second thread attempts to spawn a pair of child tasks that both target the second thread, wherein the pair of child tasks include a bypass-bound child task and a task pool-bound child task, defer the spawning of the task pool-bound child task until the bypass-bound child task and any further spawned bypass-bound descendant tasks have been completed.

12. The system of claim 11, wherein the thread management logic is further operable to:

spawn the deferred task pool-bound child task and any other deferred task pool-bound descendant tasks in the order deferred.

13. The system of claim 12, wherein the thread management logic is further operable to:

storing a deferral list to preserve the spawn order of the deferred task pool-bound child task and the any other deferred task pool-bound descendant tasks.

14. The system of claim 11, wherein the thread management logic is further operable to:

when the first hardware thread is idle, cause the first hardware thread to take a task from the front of the first hardware thread's task pool;

when the first hardware thread task pool is empty, cause the first hardware thread to take a task from the front of the first hardware thread's mailbox; and when the first hardware thread's mailbox is empty, cause the first hardware thread to attempt to steal a task from the back of the second hardware thread's task pool.

15. The system of claim 11, wherein the thread management logic is further operable to:

when the first thread is blocked from stealing the mailed task, cause the first thread to attempt to steal a predecessor task in the second thread's task pool.

16. A non-transitory computer readable medium having embodied thereon instructions, which when executed by a computer, results in the computer performing a method comprising:

managing one or more threads attempting to steal task work from one or more other threads by blocking at least a first thread from stealing a mailed task from a second thread's task pool when the mailed task was mailed by the second thread to an idle third thread, wherein each of the one or more threads includes a bypass which is capable of storing a task that is to immediately be worked on by the thread;

deferring a spawning of one or more tasks from at least one of the one or more other threads; and when the second thread attempts to spawn a pair of child tasks that both target the second thread, wherein the pair of child tasks include a bypass-bound child task and a task pool-bound child task, deferring the spawning of the task pool-bound child task until the bypass-bound child task and any further spawned bypass-bound descendant tasks have been completed.

17. The computer readable medium of claim 16, wherein the performed method further comprises:

spawning the deferred task pool-bound child task and any other deferred task pool-bound descendant tasks in the order deferred.

* * * * *